United States Patent [19]
Vyakarnam et al.

[11] Patent Number: 5,310,582
[45] Date of Patent: May 10, 1994

[54] APPARATUS AND HIGH SPEED METHOD FOR COATING ELONGATED FIBERS

[75] Inventors: Murty N. Vyakarnam, East Lansing; Lawrence T. Drzal, Okemos, both of Mich.

[73] Assignee: Board of Trustees operating Michigan State University, East Lansing, Mich.

[21] Appl. No.: 20,112

[22] Filed: Feb. 19, 1993

[51] Int. Cl.$^5$ .................................................. B05D 3/12
[52] U.S. Cl. ..................................... 427/560; 427/174; 427/180; 427/195; 427/565; 118/33; 118/309; 118/612; 118/672
[58] Field of Search ............... 427/174, 185, 195, 565, 427/560, 180; 118/308, 309, 612, 672, DIG. 5, 33; 28/283; 19/65 T, 66 T

[56] References Cited

U.S. PATENT DOCUMENTS

| | | |
|---|---|---|
| 3,197,324 | 7/1965 | Brooks ............................. 427/185 |
| 5,042,111 | 8/1991 | Iyer et al. . |
| 5,042,122 | 8/1991 | Iyer et al. . |
| 5,102,690 | 4/1992 | Iyer et al. . |
| 5,123,373 | 6/1992 | Iyer et al. . |
| 5,128,199 | 7/1992 | Iyer et al. . |
| 5,213,843 | 5/1993 | Working ........................... 427/195 |

FOREIGN PATENT DOCUMENTS 152978 7/1973 Fed. Rep. of Germany ...... 427/185

Primary Examiner—Terry J. Owens
Attorney, Agent, or Firm—Ian C. McLeod

[57] ABSTRACT

An apparatus and method for uniformly coating a fiber or tow of fibers (10) with a powder at relatively high speed to produce a prepreg. The apparatus uses an elongated chamber (401) in a container (400) for confining the fiber which is coated by an aerosol of powder dispensed from a powder dispensing apparatus (500) in counter-current mode. A fiber tensioning apparatus (300) for the fiber maintains the proper tensioning of the fibers spread by a speaker (201) below the fibers on roller bars (203) so that the uniformly spread fibers are fed to the chamber (401). A heater apparatus (600) fuses the powder to the fiber and then is taken up on a spool (700).

25 Claims, 4 Drawing Sheets

APPARATUS AND HIGH SPEED METHOD FOR COATING ELONGATED FIBERS

BACKGROUND OF THE INVENTION

Field of the Invention

The present invention relates to an improved apparatus system and method for the high speed coating of fibers, particularly in a tow of fibers, with polymer particles. In particular the present invention relates to a process wherein the fibers are coated in an elongated vertically oriented chamber using a countercurrent flow of an aerosolized powder.

Description of Related Art

The prior art is described in U.S. Pat. Nos. 5,102,690 and 5,123,373 to Iyer, Drzal and Jayaraman and 5,128,199, 5,042,122 and 5,042,111 to Iyer and Drzal. These patents describe a chamber wherein the fibers, particularly in the form of a tow, are coated during a horizontal flow of the fibers through a chamber. On scale-up at higher tow speeds, it was found to be very difficult to maintain a uniform coating of the powder on the fibers, which is essential in producing a prepreg, which is where the powder is fused to a tow of fibers.

OBJECTS

It is therefore an object of the present invention to provide an improved system for fiber coating with polymer particles. It is particularly an object to provide an improved system which operates at relatively high speeds and which functions reliably to produce uniformly coated fibers. These and other objects will become increasingly apparent by reference to the following description and the drawings.

DESCRIPTION OF THE PREFERRED EMBODIMENTS

Figure 1:
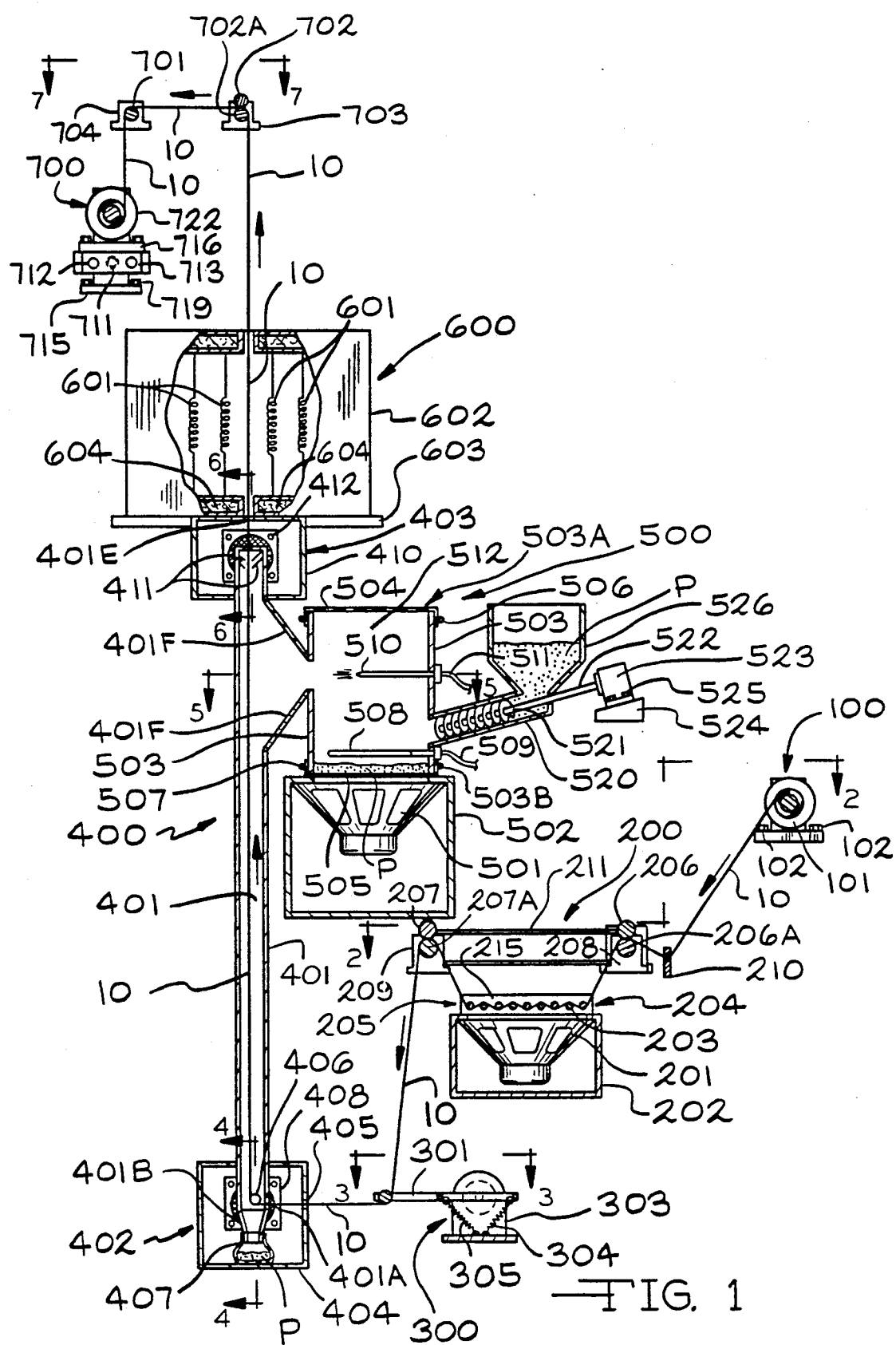
FIG. 1 is a front cross-sectional view of the preferred system of the present invention, particularly showing the coating apparatus 400 and powder dispensing apparatus 500.
Figure 2:
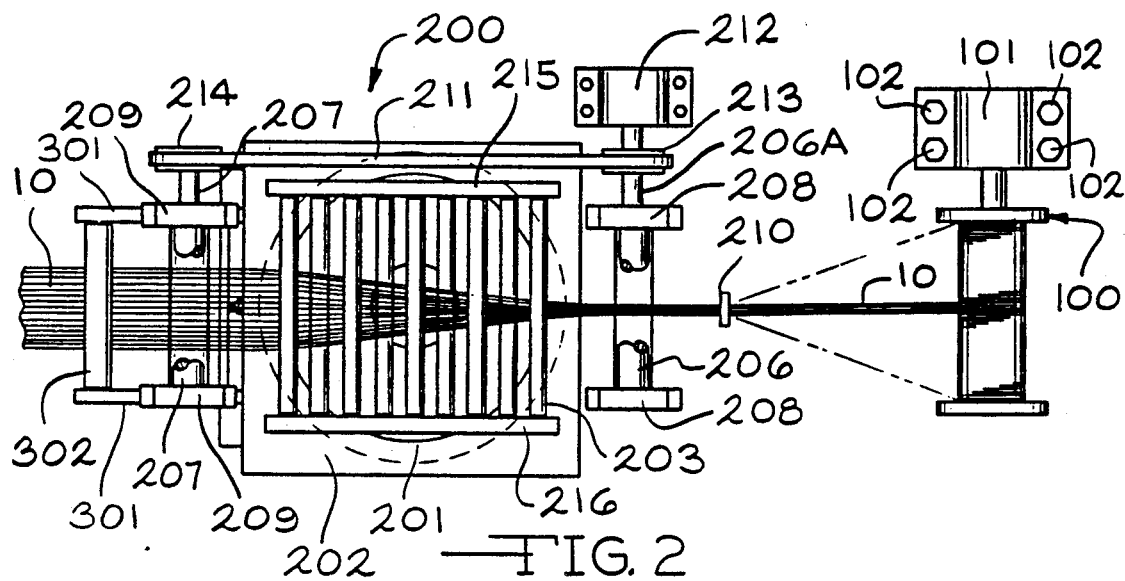
FIG. 2 is a plan view along line 2—2 of FIG. 1, particularly showing the preferred fiber spreading apparatus 200 of the present invention.
Figure 3:
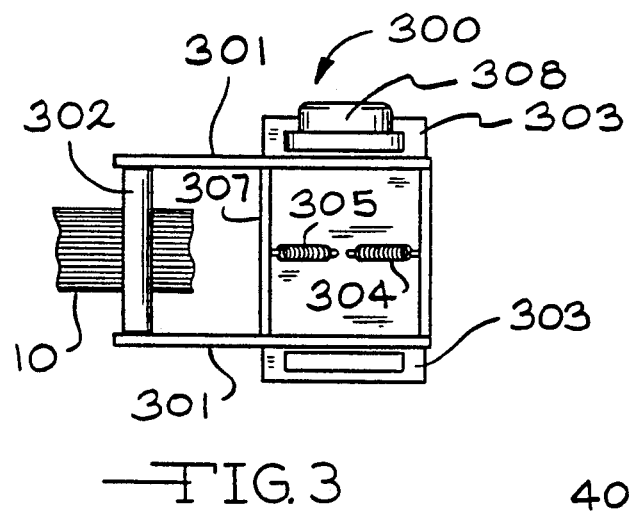
FIG. 3 is a plan view along line 3—3 of FIG. 1 showing the fiber tensioning apparatus 300 of the present invention.
Figure 4:
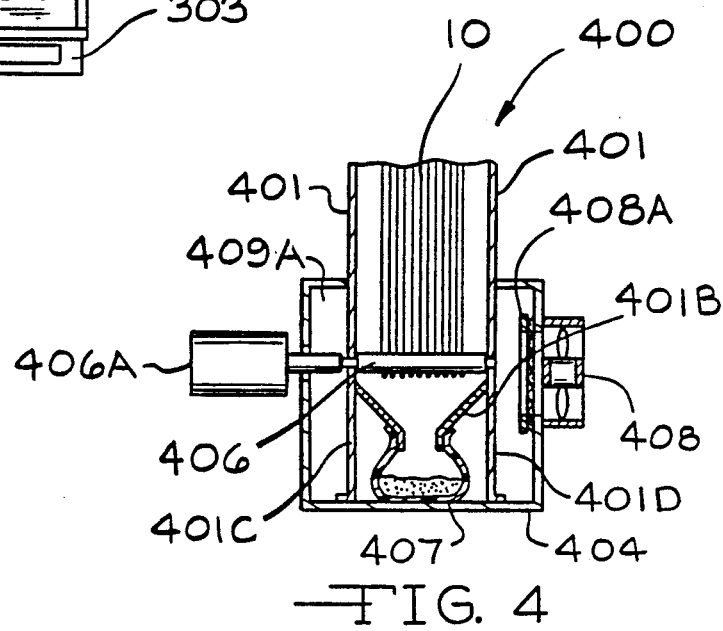
FIG. 4 is a side cross-sectional view along line 4—4 of FIG. 1 showing a housing 404 around a chamber 401 and a rod 406 controlled by motor 406A around which the tow of fibers 10 is moved at a right angle in the chamber 401.
Figure 5:
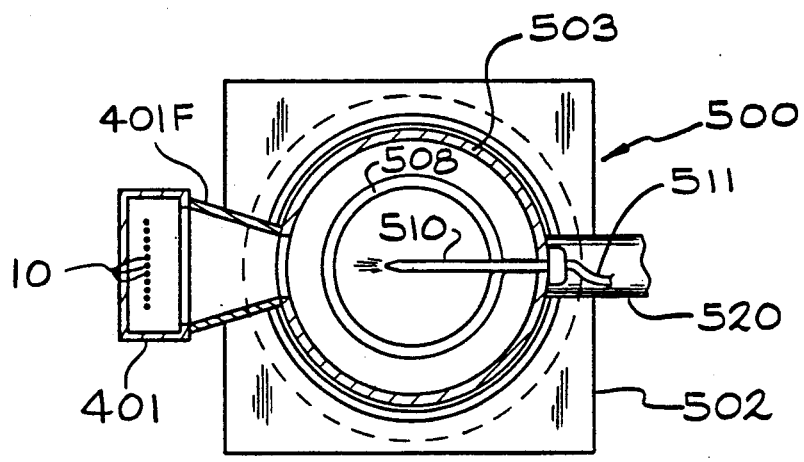
FIG. 5 is a cross-sectional view along line 5—5 of FIG. 1 showing the dispensing apparatus 500 and particularly a nozzle 510 for directing the powder P into the chamber 401 from the dispensing apparatus 500.
Figure 6:
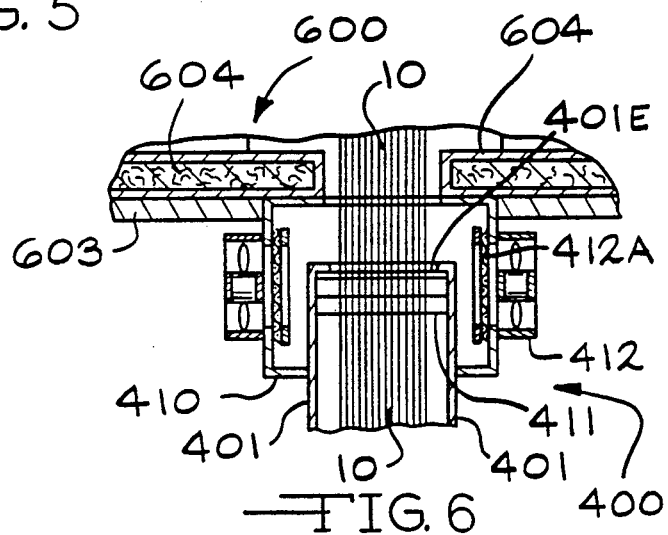
FIG. 6 is a side cross-sectional view along line 6—6 of FIG. 1 showing a housing 410 around chamber 401 and baffles 411 for directing powder P back into the chamber 401.
Figure 7:
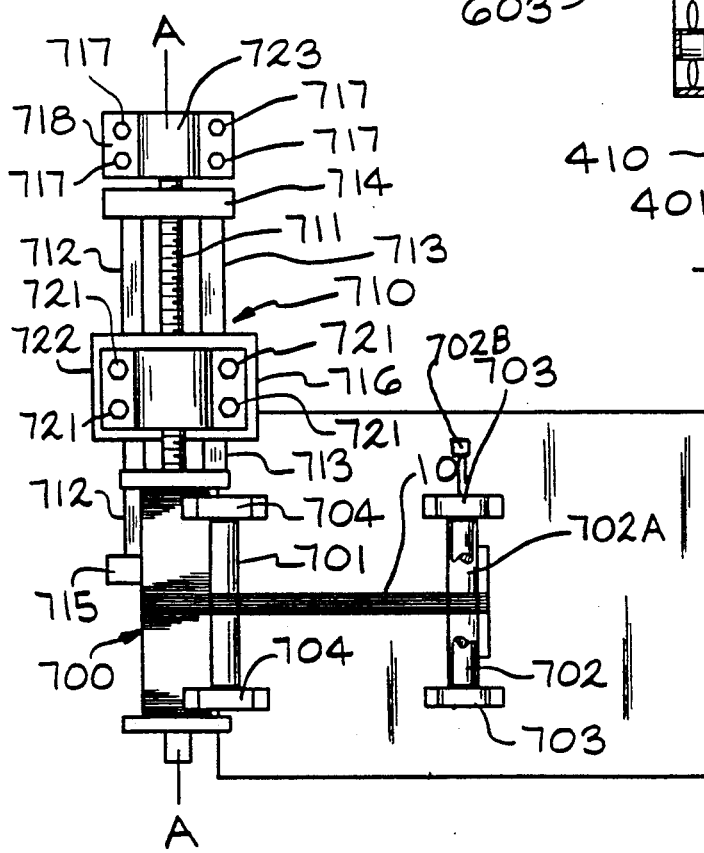
FIG. 7 is a plan view along line 7—7 of FIG. 1 showing the winding motor 722 for take up spool 700.

The present invention relates to an apparatus for coating a length of fiber with a powder which comprises: an elongated chamber defined by inside and outside walls of a container means with openings for inlet and outlet of the fiber adjacent to opposed portions of the chamber means such that the fiber is fed between the openings through the chamber without touching the walls; a powder dispenser means with a connection to the container, wherein the dispenser means is provided with a aerosolizing means for aerosolizing a powder in a gaseous medium in the dispenser means; and a nozzle means connected to a gas supply means which is directed towards the connection of the dispenser means to the container means, wherein in use the aerosolizing means aerosolizes the powder in the dispenser means and the nozzle means directs the aerosolized powder into the container means so that the powder flows over the fiber as the fiber passes through the container means.

Further, the present invention relates to an improvement in a system for coating a tow of fibers with a powder at high speed wherein the tow is spread, the tow is coated with the powder, and the powder is fused to the tow to provide a coated tow, which comprises: a spreader means for spreading the tow of fibers; a tow spool for the tow of fibers controlled by a motor which maintains a tension of the tow in the spreader means between an inlet and an outlet from the spreader means; tension sensing means which maintains the tension on the tow between the inlet and the outlet of the spreader means by regulating the speed of the spool controlled by the motor, wherein the tension sensing means is an arm over which the tow passes with a position sensor mounted thereon, wherein the sensing means regulates the speed of the motor such that the arm is maintained in a preselected position and the tension on the tow is uniform.

Finally the present invention relates to a method for coating a length of fiber with a powder which comprises: providing an apparatus for coating a length of fiber with a powder which comprises: an elongate chamber defined by inside and outside walls of a container means with openings for inlet and outlet of the fiber adjacent to opposed portions of the chamber means such that the fiber is fed between the openings through the chamber without touching the walls; a powder dispenser means with a connection to the container, wherein the dispenser means is provided with a aerosolizing means for aerosolizing a powder in a gaseous medium in the dispenser means; and a nozzle means connected to a gas supply means which is directed towards the connection of the dispenser means to the container means, wherein in use the aerosolizing means aerosolizes the powder in the dispenser means and the nozzle means directs the aerosolized powder into the container means so that the powder flows over the fiber as the fiber passes through the container means; and coating the fiber with the powder in the chamber.

The speed of the fiber or tow of fibers is preferably between about 1 and 60 cm/sec, preferably 20 to 30 cm/sec. This speed of operation is obtainable because of the elongate, vertically oriented construction of the chamber and the separate dispenser for the powder. Further, the system for spreading the fibers contributes significantly to the speed of the powder coating because of the uniformity of the spreading of the tow of fibers. For a given speed and spread width of the fibers, the coating concentration is dependent upon the concentration of the aerosol in the coating chamber.

FIGS. 1 to 7 show the improved system and components of the present invention. The system as shown in FIG. 1 generally includes a dispensing spool 100, a fiber spreading apparatus 200, a fiber tensioning apparatus 300, an elongate, vertically oriented fiber coating container 400, a powder dispensing apparatus 500, a heater apparatus 600 and a take-up spool 700.

The dispensing spool 100 dispenses a tow of fibers 10. The dispensing spool 100 is mounted on a motor 101 secured by bolts 102 to a support (not shown). The fibers 10 are fed to the spreader 200 from the spool 100 shown in FIGS. 1 and 2. The spreader 200 includes an acoustical speaker 201 mounted in a cabinet 202. Circularly cross-sectioned roller bars 203 are provided over which the tow 10 passes. The tow of fibers 10 is spread by the sound waves from the speaker 201. The tow of fibers 10 is supported at either end 204 and 205 of the roller bars 203 by rollers 206, 206A, 207 and 207A rotatably mounted on blocks 208 and 209. Roller 206A is rotated by motor 212 (FIG. 8). The fibers are introduced into the speaker through a slotted guide 210. The rollers 206A and a chain 207A are connected by a chain link 211 and shaft 206A is driven by a motor 212 (FIG. 2) which advances the tow of fibers 10. The chain link 211 is mounted on pulleys 213 and 214 mounted on one end of rollers 206A and 207A. The rollers 203 are mounted on blocks 215 and 216. The spreading apparatus 200 is described in detail in U.S. Pat. Nos. 5,042,111, 5,042,122, 5,102,690, 5,123,373 and 5,128,199 to Iyer et al.

The tow of fibers 10 moves to a novel fiber tensioning apparatus 300 which includes arms 301 and a circular cross-sectioned roller 302 supported by the arms 301 over which the tow of fibers 10 rolls. The arms 301 are pivoted on support base 303 and biased in a neutral horizontal portion by coil springs 304 and 305 connected between cross members 306 and 307 between the arms 301 and the base 303. An optical position encoder 308 senses whether the arms 301 are above or below the neutral horizontal position and is electrically connected to motor 212. The tensioning apparatus 300 is designed to maintain a constant low level of tension on the tow of fibers 10 in the spreader apparatus 200.

The spread tow of fibers 10 then passes into a novel fiber coating container 400, which includes an elongated, vertically oriented, preferably rectangularly cross-sectioned chamber 401 as shown in FIGS. 4 and 5. The chamber 401 includes a fiber inlet end 402 and a fiber outlet end 403. The end 402 includes a housing 404 with openings 405 and 401A through which the tow of fibers 10 passes. The tow of fibers 10 passes over a rod 406 connected to a motor 406A operating at the same speed as motor 702B and makes a right hand turn and moves vertically in the chamber 401. The powder that settles at the bottom of chamber 401 during operation of the process may be recycled to the hopper 526 of the auger 521 on a continuous basis. As shown in FIGS. 1 and 4, the chamber 401 is provided with a tapered section 401B which leads to a bag 407 for collecting unused powder passing through the chamber 401. The chamber 401 is provided with extensions 401C and 401D which support the section 401A, but which allow access to bag 407 for periodic removal. A fan 408 with a filter pad 408A is mounted on the housing 404 which draw air from the housing 404 and collect small amounts of powder P leaking from opening 401A.

As shown in FIGS. 1 and 6, the outlet end 403 is provided with a housing 410. Downwardly facing baffles 411 tend to redirect the powder back into chamber 401, preventing loss of powder from the top of the chamber 401. Fan 412 is provided with a filter 412A for collecting powder from housing 410. The tow of fibers 10 exit through an opening 401E and pass into heater 600 discussed in detail hereinafter.

As shown in FIGS. 1 and 5, the chamber 401 is provided with a tapered inlet duct 401F which is connected to the powder dispensing apparatus 500. It is this apparatus 500 which is most important to the present invention and which provides a uniform aerosolized powder to the chamber 401 for coating of the fiber 10 with the powder P. The powder dispensing apparatus 500 includes a speaker 501 supported in housing 502. A cylindrically cross-sectioned drum 503 is supported on the housing 502 and has open ends 503A and 503B which are covered by flexible elastic rubber diaphragms 504 and 505 secured by ring clamps 506 and 507. Inside the drum 503 a ring 508 is provided mounted on the drum 503 above the diaphragm 505. The ring 508 is perforated and connected to a gas line 509. Above the ring 508 and mounted on drum 503 a nozzle 510 is provided with an opening pointed towards the tapered inlet duct 401F. The nozzle 510 is supplied by a gas supply line 511. The drum 503 defines confined space 512. A feeder tube 520 is mounted on the drum 503 and feeds powder P to the diaphragm 505. The tube includes an auger 521 mounted in a shaft 522 driven by a motor 523 secured on a support 524 by bolts 525. A hopper 526 leads into the tube 520 for supplying the powder P to the tube 520.

The tow of fibers 10 after being coated with the powder P in chamber 401 passes into a heater apparatus 600 with heating coils 601 inside an enclosure 602 supported on a base 603. The enclosure 602 contains insulation 604 (FIG. 6) which prevents the chamber 401 and housing 410 from being heated to too high a temperature.

The tow of fibers 10 is then moved over rollers 702, 702A, and 701 supported at either ends by blocks 703 and 704. A motor 702B (FIG. 8) is provided to rotate roller 702A. The take-up spool 700 winds the coated tow of fibers 10 on the spool 700 using the motor 722 (FIG. 8). Winding motor 710 is provided to keep the tow of fibers 10 uniformly wound across the spool 700. The motor 723 includes a threaded winding rod 711 on which the spool 700 is mounted. The posts 712 and 713 are supported at opposed ends by plates 714 and 715. A block 716 is mounted on the rods 712 and 713 and on threaded rod 711 so that the spool 700 moves back and forth along the axis a-a of threaded rod 711 to wind the tow of fibers 10. Bolts 717 hold the base 718 for motor 723 in position. Bolts 719 hold the blocks 714 and 715 in position. Bolts 721 hold reel motor 722 on the block 716. The assembly including the reel motor 722 moves back and forth along the threaded rod 711.

In operation the tow 10 is unreeled from the spool 100 and fed to the spreader 200 which spreads the tow on rollers 203. The tension on the tow of fibers 10 in the spread form is uniformly maintained in the spreader 200 by the roller 302 of the tensioning apparatus 300. The spread tow of fibers 10 then pass through the chamber 401 and is coated with the powder P which is moving countercurrent to the movement of the tow of fibers 10 as it is dispersed from the powder dispensing apparatus 500. The tow 10 then is heated in heater apparatus 600 to fuse the powder on the tow and then wound on spool 700 to provide a prepreg which is then used to form laminates in the manner known to the prior art.

The dispensing apparatus 500 moves powder P from hopper 526 to the drum 503 by means of screw 521 operated by motor 523. The powder P rests on the diaphragm 505. The speaker 501 vibrates the diaphragms 504 and 505 to aerosolize the powder P. In addition, the ring 508, which is preferably used, is perforated and fed with a dried gas such as nitrogen through line 509, which produces more uniform aerosolization in the confined space 512 of the drum 503. The powder P is then directed into the chamber 401 by means of the nozzle 510 fed by a dried gas such as nitrogen through line 511. In this manner a uniform dispersion of the powder P is entrained to the top of chamber 401 and moves countercurrent to the tow of fibers 10. The inlet extension 401F expands towards the tow of fibers 10 to reduces the horizontal velocity and aids in dispersing the powder P on the tow of fibers 10 due to the expansion.

It is preferred to use a knocker mechanism (not shown) on the outside walls of the drum 503 to prevent powder from accumulating on the inside walls of the drum 503. A conductive surface, preferably a metal lining in the drum 503 can be used when necessary to prevent the powder from caking the walls of the drum 503.

The powder P is deflected by baffles 411 back into the chamber 407 and collected in bag 401. It will be appreciated that any sort of collector could be used, such as a bag filter (not shown) or the material can be continuously recycled back to the hopper 526.

The improved powder prepreg process was particularly developed for making polymer matrix prepreg tapes of continuous fibers at high speed. An increase in processing speed by over an order of magnitude with respect to the earlier devices of Iyer et al. were achieved. A novel chamber and powder dispenser for impregnating the spread fiber with the polymer particles was developed. This means that the impregnation chamber 401 with powder dispenser 500, i) provides the required residence times in the chamber 401 at high speeds, ii) allows the generation of aerosol particles independent of the impregnation in the chamber 401, and iii) enables easier control of the particles deposited on the fibers by controlling the entrainment rate of aerosol into the chamber 401.

Economic analysis indicated that a prepregging rate of 20 cm/s was necessary to make the powder process economically viable. The spreader apparatus 300 was scaled up based on the same design parameters as for Iyer et al U.S. Pat. No. 5,042,122. However, in the case of the aerosolizer, preliminary designs indicated that a linear scale up of the apparatus of U.S. Pat. No. 5,102,690 with fiber flow in the horizontal direction resulted in large dimensions which were unwieldy particularly for acoustic aerosolization using a speaker. The distance in the horizontal chamber was estimated to be of nearly 80 inches (203.2 cm) long which posed spatial problems. Therefore, the separate powder dispensing apparatus 500 was developed which met the requirements of residence times. The vertical position of the chamber 401 was discovered as the solution to this problem.

Experiments on the aerosolizer of U.S. Pat. No. 5,102,690 indicated that acoustic energy alone was not sufficient to provide the required higher mass transfer rates to entrain the aerosol from the generator to the impregnation chamber in some situations. This led to the circular ring 508, just above the feed bed to assist the entrainment of the aerosol. The aerosol is then entrained into the impregnation chamber by the nozzle 510. This provided an efficient mode for aerosol entrainment and its control.

One important feature of the process of the present invention is that aerosol generation is conducted outside of the region of contact with the fibers in the chamber 401 and that powders of any type can be used in the process depending on the characteristics of the powder. For example aerosol generation can be gas fluidization alone in case of aeratable type of powders. Cohesive type of powders can use acoustic energy for aerosol generation. The other advantage of independent aerosol generation is in the case of depositing a second or third type of powder on the fibers simultaneously. Aerosols of these powders can be generated separately and entrained into the impregnation chamber simultaneously thereby impregnating more than one type of matrix. Aerosols of 10 micron size nylon powder (cohesive powder) were generated using acoustic speaker 501. A novel feature of this acoustic aerosol generator was the circular ring 508 with holes which are directed upward at regular intervals (0.35 mm in diameter) positioned just above the feed bed. Dry nitrogen gas was passed through this circular ring 508 to generate a series of jets from the holes. The upward momentum created by the jets has significantly improved the rate of aerosol generation. This mode of nitrogen entry into the powder dispensing apparatus 500 has also decreased the degree of agglomeration of the cohesive type C nylon powder (5 micron in size).

The aerosol generated hovers near the upper portion of the drum 503. This aerosol is continuously entrained through the opening in the drum into the impregnation chamber 401 via the duct 401F. The rate of entrainment is controlled by the gas flow rate through the nozzle 510. The nozzle 510 design and position optimize the use of gas and provides the requisite momentum for entrainment to the aerosol. The pyramidal duct 401F and the entry to the impregnation chamber 401 is designed such that i) there is a rapid expansion in the area of cross-section thereby reducing the velocity of the particles in the aerosol; and ii) the slope of the duct 401F is greater than the angle of repose of the powder entrained. This ensured that few particles settle in the duct 401F and that all the entrained particles were subjected to a free fall sedimentation.

The objective of the fiber coating apparatus 400 is to deposit a controlled amount of matrix on the fibers. In this process, the rate of gas flow into the circular ring 508 controls the rate of aerosol generation. Further, the rate of gas flow to the nozzle 510 controls the rate of entrainment. The concentration of particles in the impregnation chamber 401 is directly proportional to the rate of aerosol entrainment. Finally, the matrix volume fraction of the prepreg is a function of the particle concentration. The polymer particles acquire a charge due to tribocharging and electrostatic attraction appears to be the primary mode of adhesion between the particles and the spread fibers.

Figure 8:
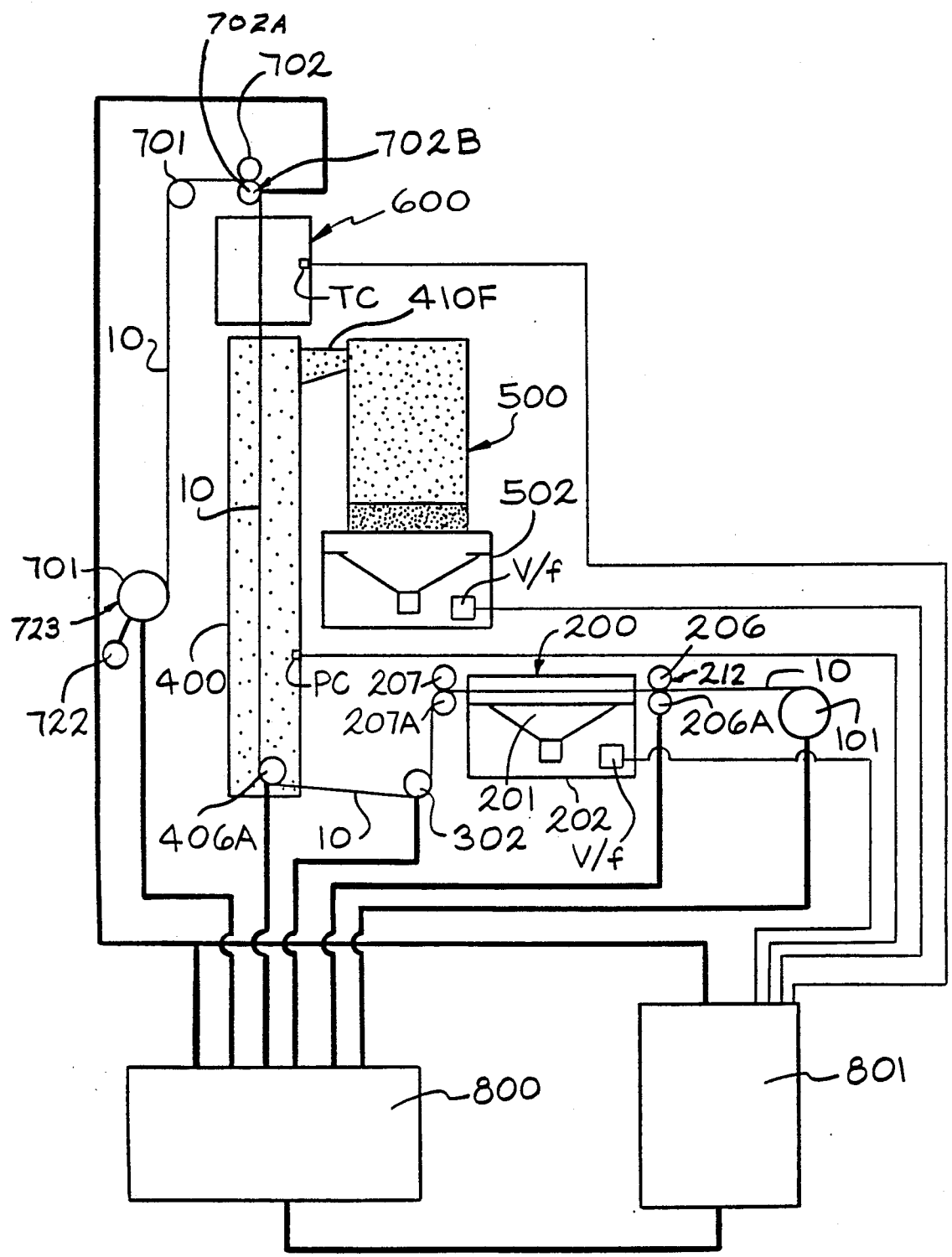
FIG. 8 is a schematic view of the apparatus of FIG. 1 showing the motors 101, 212, 406A, 702B, 722 and 723, as well as motor controller 800 and computer controller 801.

The brittle nature of carbon fibers and the high speed of operation required a sophisticated control system. The earlier system developed by Iyer et al. had the problem of matching two motor speeds in the line, without any tension sensor 300. This resulted in frequent stalling of motors or manual intervention on the take up spool to control tension in the line. These problems have been overcome with the incorporation of the dedicated fiber tensioning apparatus 300. This apparatus 300 through controller 800 and computer controller 801 coordinates the speed of the six (6) motors in the system (FIG. 8) using six dc analog servo PID controllers to give a smooth fiber motion in the system, while the fiber tensioning apparatus 300 takes care of the fluctuations in the process. The speed of the operation is set on the motor 702B and all the other motors 101, 212, 406A, 722 and 723 suitably adjust their speeds as seen in FIG. 8. In FIG. 8 PC is particle concentration, TC is temperature control, V is voltage and f is frequency. The heavy electrical lines are for the control signals from the controller 800 and the light lines are from the computer controller 801.

For efficient spreading in the spreading apparatus there should be a net zero tension on the fiber tow. This is achieved by the second motor 212 which feeds the fiber tow on to the spreading apparatus 200 and whose speed is controlled by a feedback signal from the tensioning apparatus 300, sensor located just after the spreader apparatus 200. In fact a set of rollers 206, 206A and 207 and 207A before and after the spreading apparatus 200 linked by chain 211 maintain a constant speed of the fiber tow on the spreader by means of motor 212. The tension apparatus consists of a lightweight dancing roller arm 301 whose displacement is monitored by an absolute optical position encoder and forms a basis for feedback to the second motor 212.

Consistent spreading forms an important aspect in the efficiency of the process. At high speeds, however, any disturbance in the fiber tow condition is reflected in the form of twists at circular rollers 206, 206A, 207 and 207A and lowers the spreading efficiency drastically. Therefore a slotted guide 210 was provided which reduced the occurrence of twists.

In view of the vertical motion of the fibers, a conventional gravity type heater apparatus 600 was modified so that the impregnated fiber tow is transported vertically through an apparatus 600 during the sintering step. The apparatus 600 is preferably an infra-red heater.

Fabrication of continuous fiber polymer composite prepreg was achieved at very low cost and with high speed. The polymer (matrix) concentration can be varied at will to produce material from a few percent (2-5%) to an over 50% coating (by volume). Any thermoplastic or thermoset powder can be used with the process along with any continuous fiber.

The method is also useful for making low matrix or binder concentration (<5%) continuous or discontinuous fiber preforms for liquid composite molding using any fiber; for coating complex shapes like microelectronics; to make multiphase composites where powder materials of different compositions can be sequentially deposited or co-deposited creating microengineered materials; for making metallic and/or ceramic matrix composites; method for making composites using deposition from a liquid onto the fiber.

The prepregs are useful to composite materials manufacturers; electronics manufacturers; the aircraft industry; the automobile industry; the furniture industry; the housing and construction industries; and the recreational industry.

The high speed process was preferably designed for an operating speed of 20 cm/s and tow sizes up to 12K (12,000 fibers in the tow) which results in a 40 times increase in the prepreg production rate compared to that disclosed in U.S. Pat. No. 5,102,690.

In operation, the fiber tow unwound from the feed spool 100 passes through the guide slot 210 onto the spreader apparatus 200. The spreading apparatus 200 consists of a set of polished rollers 203 placed over an acoustic source, such as speaker 201. The tow 10 is spread into individual fibers as it passes over the spreading apparatus 200 and then enters in the impregnation chamber 401. Independent generation of an aerosol cloud of polymer particles is achieved by powder dispenser 500. The aerosol is then entrained into the impregnation chamber 401. In this chamber 401, the spread fiber tow and the aerosol come into contact countercurrently. The matrix volume fraction depends on the particle concentration in the impregnation chamber 401 and this can in turn be controlled by entrainment rate of the aerosol. The particles deposited on the fiber tow in the impregnation chamber 401 are then sintered in place in the heater apparatus 500, such as a sintering oven to heat the polymer particles and fibers which travel in the vertical direction. The prepreg tape exiting from the heater is rastered on a takeup spool 700.

The speed of the operation is controlled by a master set point given from a dedicated process control system which coordinates the motion of the six motors 101, 212, 406A, 702B and 722 and 723. In order to maintain zero tension on the spreading apparatus 200, the feedback from tension apparatus 300 controller is provided to the motor 212A which feeds the fiber tow to the spreading apparatus 200. The fiber tensioning apparatus 300 incorporates the dancing tension roller 302 whose displacement is monitored by the optical position encoder 308. This features handles all the fluctuations in the process and maintains the efficiency of the spreading apparatus 200 even at speeds above the designed speed.

The process was successfully operated at the designed speed of 20 cm/s of prepreg tape for a carbon fiber—polyamide matrix powder system. Table 1 is indicative of the range and controllability of this process.

TABLE 1

| Results of Prepregging Runs | | |
|---|---|---|
| Process Speed cm/s | Entrainment Rate cc/s | $V_m\%$ |
| 4.5 | 410 | 41.5 |
| 21.8 | 456 | 21.1 |
| 21.8 | 506 | 39.7 |
| 30 | 554 | 45.8 |

The process was run at various conditions and the matrix volume fraction deposited was estimated. At least twenty (20) samples of one meter long prepreg tapes were cut at random from the takeup spool and weighed to estimate the average matrix volume fraction ($V_m$) of the run. Matrix volume fractions of over 45% have been obtained at a speed of 30 cm/s. Scanning electron micrographs have indicated a very uniform impregnation of particles on the fiber surfaces. This is due to the fact that fibers are impregnated in an aerosol which is a uniform dispersion of the polymer particles.

It is intended that the present description be only illustrative of the present invention and that the present invention be limited only by the hereinafter appended claims.

We claim:

1. An apparatus for coating a length of fiber with a powder which comprises:
   (a) an elongated chamber defined by inside and outside walls of a container means with openings for inlet and outlet of the fiber adjacent to opposed portions of the chamber means such that the fiber is fed vertically between the openings through the chamber without touching the walls;
   (b) a powder dispenser means with a connection to the container, wherein the dispenser means is provided with an aerosolizing means for aerosolizing a powder in a gaseous medium in the dispenser means; and
   (c) a nozzle means connected to a gas supply means which is directed towards the connection of the dispenser means to the container means, wherein in use the aerosolizing means aerosolizes the powder in the dispenser means and the nozzle means directs the aerosolized powder into the container means so that the powder flows over the fiber as the fiber passes through the container means.

2. The apparatus of claim 1 wherein the chamber is adapted so that the fiber moves upward in the container means which is vertically oriented between the inlet and the outlet and wherein the dispenser means is connected adjacent to the outlet from the container means so that the powder falls by gravity through the container means countercurrent to the movement of the fiber through the chamber.

3. The apparatus of claim 1 wherein fiber is part of a tow of fibers.

4. The apparatus of claim 1 wherein the dispenser means has a conductive surface in contact with the powder to be aerosolized which prevents the powder from caking on the walls of the dispenser means.

5. The apparatus of claim 1 wherein a gas supply means shaped as a ring is provided around an inside portion of the dispenser means above a level of the powder in the dispenser means.

6. The apparatus of claim 1 wherein the container means has vanes on the walls of the container means above the connection with the dispenser means so that powder from the dispenser means is directed into the container means and prevented from flowing out of the top of the container means.

7. The apparatus of claim 1 wherein a vibrator means is provided in the dispenser means and wherein diaphragms are provided at adjacent ends of the dispenser means which are activated to vibrate by the vibrator means to aerosolize the powder.

8. The method of claim 1 wherein the chamber is vertically oriented with the opening for the outlet above the opening for the inlet and the tow of fibers moves upward vertically and wherein the powder dispenser means is mounted on the chamber adjacent to the outlet and the powder falls by gravity through the container means countercurrent to the movement of the fiber through the chamber.

9. In a system for coating a tow of fibers with a powder at a speed wherein the tow is spread, the fibers in the tow are coated with the powder, and the powder is fused to each fiber in the tow to provide a coated tow, the improvement which comprises:
   (a) a spreader means for spreading the tow of fibers;
   (b) spool for the tow of fibers controlled by a motor which maintains a tension of the tow in the spreader means between an inlet and an outlet from the spreader means;
   (c) tension sensing means which maintains a tension on the tow between the inlet and the outlet of the spreader means by regulating the speed of the spool controlled by the motor, wherein the tension sensing means is an arm over which the tow passes with a position sensor mounted thereon, wherein the sensing means regulates the speed of the motor such that the arm is maintained in a selected position and the tension on the tow is uniform.

10. The system of claim 9 wherein the position sensor is optical such that the sensor gauges a position of the arm and instructs at least one motor to speed up or slow down so that the tow is spread and fluctuation of the fiber motion is minimized.

11. A method for coating a length of fiber with a powder which comprises:
    (a) providing an apparatus for coating a length of fiber with a powder which comprises: an elongate chamber defined by inside and outside walls of a container means with openings for inlet and outlet of the fiber adjacent to opposed portions of the chamber means such that the fiber is fed vertically between the openings through the chamber without touching the walls; a powder dispenser means with a connection to the container, wherein the dispenser means is provided with a vibrator means for aerosolizing a powder in a gaseous medium in the dispenser means; and a nozzle means connected to a gas supply means which is directed towards the connection of the dispenser means to the container means, wherein in use the aerosolizing means aerosolizes the powder in the dispenser means and the nozzle means directs the aerosolized powder into the container means so that the powder flows over the fiber as the fiber passes through the container means; and
    (b) coating the fiber with the powder in the chamber as the fiber is fed through the apparatus.

12. The method of claim 11 wherein the tow of fibers moves countercurrent to the powder in the chamber.

13. The method of claim 11 wherein the fiber is part of a tow of fibers which is spread by a spreader means and then the spread tow moves through the chamber in the container means.

14. The method of claim 11 wherein the fiber moves at a rate of 1 to 60 cm per second through the chamber means of the container means.

15. The method of claim 11 wherein a spreader means uses a vibrator means to spread a tow of fibers which are maintained as spread by a series of rollers mounted over the vibrator means so that the tow of fibers move the rollers over and under and wherein a tension sensing means maintains the tension of the tow of fibers in the spreader means.

16. The method of claim 15 wherein the tension sensing means is an arm over which the tow of fibers passes with a position sensor mounted thereon, wherein the tension sensing means regulates the speed of at least one tow winding spool motor such that the arm is maintained in a selected position and tension on the tow of fibers is uniform as it moves through the spreader.

17. The method of claim 16 wherein the position sensor is optical such that the sensor gauges a position of the arm and instructs the at least one motor to speed up or slow down as the tow is spread to maintain the tension.

18. The method of claim 11 wherein after the coating the coated fiber is heated to fuse the powder to the fiber.

19. The method of claim 17 wherein the heating is by means of infrared heating.

20. An apparatus for dispensing a powder to a chamber in a container means for coating a length of fiber which is to be fed vertically through the chamber with a powder which comprises:
(a) a powder dispenser means with a connection to the container, wherein the dispenser means is provided with an aerosolizing means for aerosolizing a powder in a gaseous medium in the dispenser means; and
(b) a nozzle means connected to a gas supply means which is directed towards the connection of the dispenser means to the container means, wherein in use the aerosolizing means aerosolizes the powder in the dispenser means and the nozzle means directs the aerosolized powder into the container means so that the powder flows over the fiber as the fiber passes through the container means.

21. The apparatus of claim 20 wherein the fiber is part of a tow of fibers.

22. The apparatus of claim 20 wherein the dispenser means has a conductive surface in contact with the powder to be aerosolized.

23. The apparatus of claim 20 wherein a gas supply means shaped as a ring is provided around an inside portion of the container means above a level of the powder in the container means.

24. The apparatus of claim 20 wherein hammer means are provided on outside sides of the dispenser means to prevent the powder from adhering to inside walls of the dispenser means.

25. The apparatus of claim 20 wherein a vibrator means is provided in the dispenser means and wherein diaphragms are provided at adjacent ends of the dispenser means which are activated to vibrate by the vibrator means to aerosolize the powder.

* * * * *

UNITED STATES PATENT AND TRADEMARK OFFICE
CERTIFICATE OF CORRECTION

PATENT NO. : 5,310,582
DATED : May 10, 1994
INVENTOR(S) : Murty N. Vyakarnam et al It is certified that error appears in the above-indentified patent and that said Letters Patent is hereby corrected as shown below:

On the title page, item [56] References Cited, under "Foreign Patent Documents", "152978" should be --1529784--.

Column 11, line 1, Calim 19, "Claim 17" should read --Claim 16--.

Signed and Sealed this

Twenty-second Day of November, 1994

Attest:

BRUCE LEHMAN

Attesting Officer

Commissioner of Patents and Trademarks